July 21, 1931.  F. TURZICKY  1,815,339
AUTOMOTIVE VEHICLE
Filed Aug. 19, 1929   2 Sheets-Sheet 2
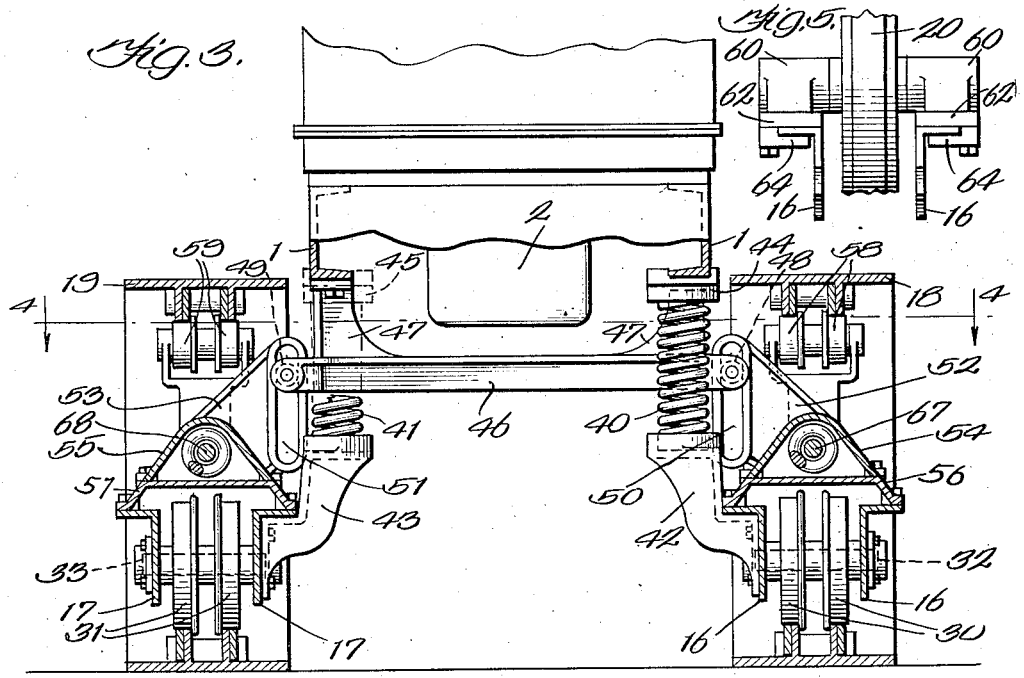
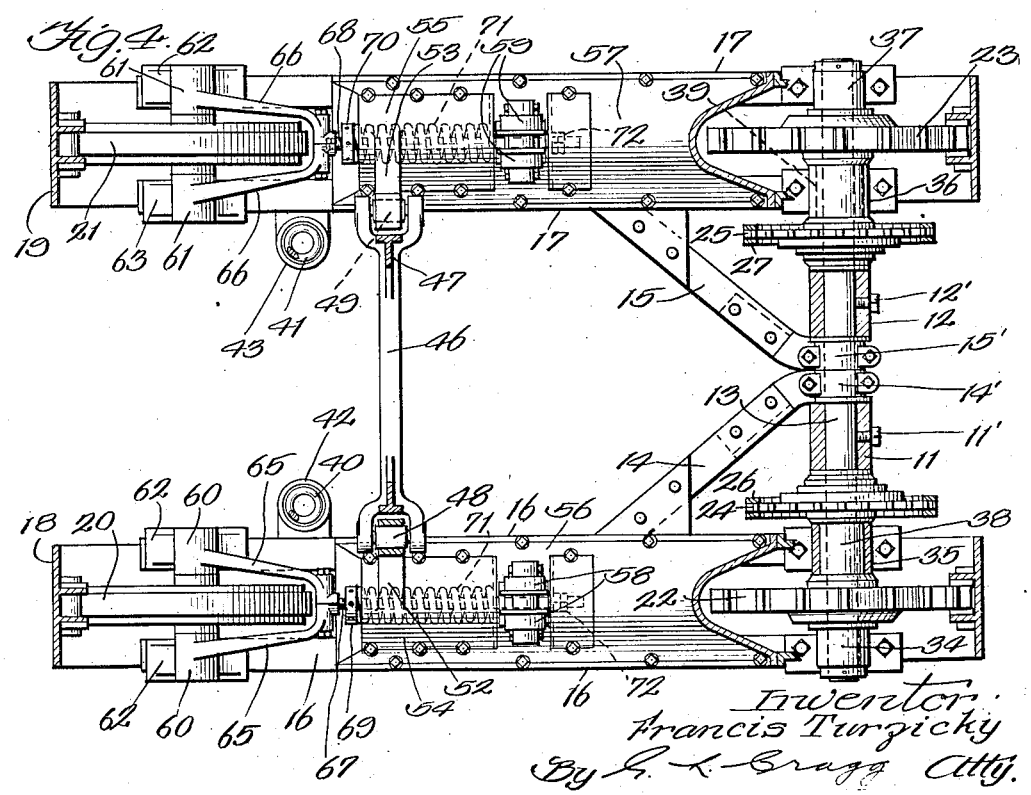
Inventor
Francis Turzicky
By G. L. Bragg Atty.

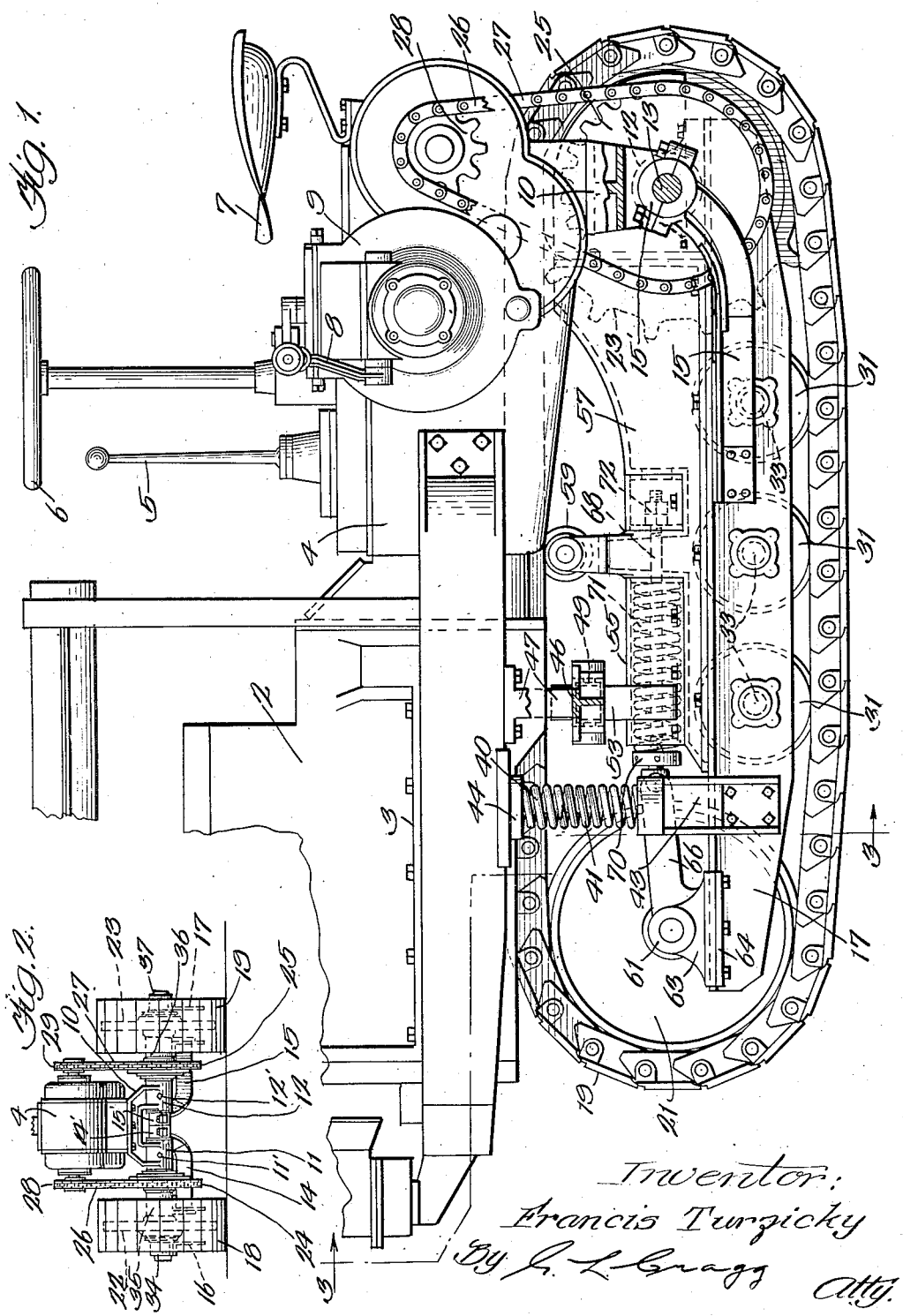

Patented July 21, 1931

1,815,339

UNITED STATES PATENT OFFICE

FRANCIS TURZICKY, OF CHICAGO, ILLINOIS, ASSIGNOR TO HENRY E. BULLOCK, OF CHICAGO, ILLINOIS

AUTOMOTIVE VEHICLE

Application filed August 19, 1929. Serial No. 386,913.

My invention relates to vehicles employing endless chain tracks, such vehicles being commonly termed tractors.

The invention resides in the provision of improved means for maintaining spaced relation between the endless chain tracks of a vehicle which employs two of such tracks.

I will explain my invention by reference to the accompanying drawings in which Fig. 1 is a side elevation of the preferred form of the invention, parts being shown in section and parts being broken away, and other parts being omitted which are not essential to an understanding of the invention; Fig. 2 is a rear view of the structure shown in Fig. 1, with some of the parts omitted; Fig. 3 is a sectional view on line 3—3 of Fig. 1; Fig. 4 is a sectional view on line 4—4 of Fig. 3; and Fig. 5 illustrates a detail of construction.

The vehicle body is inclusive of two longitudinal sills 1, which are preferably made of iron. The casing 2 of the internal combustion engine has its lower portion interposed between said sills and is provided with ribs 3, which are bolted to the tops of the sills. The casing 4 has the gearing between the internal combustion engine and the endless tracks and is interposed between the rear ends of said sills which are bolted to this casing. I have illustrated a speed changing and reversing lever 5, the steering wheel 6 and the operator's seat 7 upon the casing 4. A lever 8 of the steering clutch mechanism is journaled upon a continuation 9 of the casing 4, this casing continuation enclosing the steering gearing and braking mechanism that pertains to one of the endless tracks. Each track has such mechanism.

The rear casing portion 4 of the vehicle body carries a depending bracket 10 which is bolted to the bottom of the casing 4. This bracket is in the form of an inverted U, the sides of the U terminating in horizontally aligned mounting sleeves 11 and 12, which extend transversely of the vehicle and are at the rear end thereof. A shaft 13 passes through these mounting sleeves and extends from one side of the entire vehicle to the other. This shaft constitutes a bearing for the arms 14 and 15 which are provided upon and constitute upwardly extending projections of the truck frames 16 and 17. These truck frames are laterally beyond the body of the vehicle, said arms extending rearwardly, inwardly and upwardly to have bearing upon the shaft.

In the preferred embodiment of the invention, the arms are provided with separable cap sections 14′, 15′ which complete the formations of the bearings thereon through which said shaft passes. The shaft is desirably stationary being secured in fixed relation to the mounting sleeves 11 and 12 by the bolts 11′, 12′. The truck frames 16 and 17 are respectively surrounded by the endless chain tracks 18, 19. These tracks are horizontally elongated and respectively pass over the idler wheels 20 and 21 and the driving sprocket wheels 22 and 23, which are disposed at the ends of the tracks, as illustrated. The driving sprocket wheels are journaled upon the shaft 13 and are independently rotatable. These driving sprocket wheels are coaxial with and respectively in fixed relation to the sprocket wheels 24 and 25. The sprocket chains 26 and 27 are, respectively, in driving relation to the sprocket wheels 24 and 25 and are respectively driven by the sprocket wheels 28 and 29 which are driven by the engine through the intermediation of gearing that is enclosed within the casing 4. The truck wheels 30 and 31 are arranged in pairs upon shafts 32, 33 which are respectively in fixed relation thereto. These shafts are arranged horizontally and crosswise of the vehicle and are journaled in the truck frames 16 and 17, respectively. Said wheels turn upon the inner top sides of the bottom stretches of the endless chain tracks to which they respectively relate.

In addition to the turning engagement of the shaft 13, which is fixed with relation to the vehicle body, with the rear ends of the arms 14 and 15, turning engagement of the vehicle body with other bearings that are carried by the truck frames is also afforded. The additional bearings that are carried by the truck frames are indicated at 34, 35, 36 and 37. The sprocket wheels 22 and 24 are provided with a common hub 38 and the sprocket wheels 23 and 25 are provided with a common hub 39. These hubs are respectively journaled in the bearings 35 and 36, and they both are journaled upon the shaft 13. The said shaft is journaled directly in the bearings 34 and 37. The rear ends of the truck frames are, in turn, journaled upon said shaft to permit oscillating movements of the truck frames in vertical directions with reference to each other and with reference to the vehicle body. The swinging movements of the truck frames upon the stationary shaft 13 are yieldingly limited by the upright coiled bolster springs 40 and 41, which are located near the forward ends of the truck frames. These springs are bottomed within sockets that are provided at the upper ends of brackets 42, 43, which are bolted to the inner sides of the truck frames 16 and 17. The upper ends of these springs are received within sockets 44 and 45 which are carried by and beneath the sills 1. As hitherto set forth, the mounting sleeves 11 and 12 are in fixed relation with the shaft 13. The space between these sleeves is filled by the rear ends of the arms 15, which are journaled upon the shaft 13, and upon which said shaft is journaled. Said mounting sleeves thus cooperate with said arms to maintain the rear portions of the truck frames in spaced apart relation. The forward parts of the truck frames are maintained in spaced apart relation by means of a strut which is inclusive of a transverse horizontal bar 46 having upwardly extending wings 47, which are bolted to and beneath the sills 1. The bar 46 is bifurcated at its ends. Rollers 48, 49 are journaled between the sides of the bifurcated ends of said bar. These rollers are received by the upright slots 50, 51 which are formed in brackets 52 and 53 that are carried by housings 54 and 55 that are respectively provided upon the truck frames 16, 17. These housings are bolted upon supports 56 and 57. The latter supports which are carried upon and above the truck frames, cooperate therewith to form housings that partially enclose the sprocket wheels, chains and the idler wheels 30 and 31 that are all carried by the truck frames. The members 56 and 57 are, thus, essentially cover plates for the truck frames. These cover plates also serve as a distance preserving means to keep the sides of the truck frames in spaced apart relation. Said cover plates also carry idler rollers 58 and 59 upon which the mid-portions of the upper stretches of the endless track frames may bear to keep these stretches from sagging.

The idler wheels 20, 21 are automatically positioned to prevent the formation of undue slack in the track chains. To this end, these idler wheels are journaled upon bearings 60 and 61, which are in the form of sleeves that are made integrally with supports 62, 63. These supports are formed not only to slide upon the tops of the truck frames, but also to engage the sides of the upper portions of the truck frames and carry plates 64 which underlie the flanges that are provided upon the tops of the truck frames. Said supports 62 and 63 are thus in the nature of cross heads which are confined to straight lines of travel that are parallel with the truck frames. Said supports are also provided with arms 65 and 66 that are preferably formed integrally therewith. These arms extend rearwardly and have their inner ends in alignment with the housings 54 and 55, respectively. The two arms upon each support are bolted together to constitute a U-shaped yoke which accommodates the corresponding idler wheels 20', 21. The horizontal rods 67 and 68, which are arranged lengthwise of the vehicle, have their forward ends screwed into the bights of the aforesaid yokes. Abutment wheels 69 and 70 are screwed upon these rods. Compression coil springs 71 surround said rods and have their forward ends in engagement with said abutments. The rear ends of these springs have abutting engagement with portions of the cover plates 56, 57 as illustrated in Fig. 1. The rear ends of the rods 67, 68 slide within holes that are provided in the cover plates 54, that are also illustrated in Fig. 1. The rear ends of the rods 67 and 68 have adjusting nuts 72 screwed thereon, these nuts being engageable with wall portions of the housing portions 56 and 57, as illustrated in Fig. 1. By means of these nuts, the effective lengths of said rods 67 and 68 are determined. The springs 71 press forwardly and bring said nuts into engagement with the wall portions complemental thereto and thereby define normal forward positions of the idler wheels 20 and 21 and serve to prevent the presence of undue slack in the endless track chains. If there should be any undue strains that would tend to reduce the spacing between the idlers 20 and 21 at the forward end of the truck frames and the sprocket wheels at the rear ends of the truck frames, the springs 71 will serve as buffer springs.

Changes may be made without departing from the invention.

Having thus described my invention, I claim:

In a tractor, a body, endless chain tracks extending along the sides of the body respectively, truck frames surrounded respectively by said tracks, front and rear wheels carried by each truck frame and over which the related track chain passes, a shaft upon which said rear wheels are rotatably mounted, a drive sprocket wheel fixed to each of said rear wheels inwardly of the latter and also rotatably mounted upon said shaft, converging arms carried by the truck frames and having ends journaled upon the shaft between the drive sprocket wheels, and sleeves fixed upon the shaft, each of said sleeves occupying the entire space between the hub of one of the drive sprocket wheels and an adjacent end of one of the arms whereby said sleeves serve to hold the sprocket drive wheels against inward displacement on the shaft and the adjacent ends of said arms against outward displacement on the shaft.

In witness whereof, I hereunto subscribe my name.

FRANCIS TURZICKY.